No. 617,176. Patented Jan. 3, 1899.
T. MURPHY.
BALL BEARING SCISSORS.
(Application filed Jan. 7, 1898.)

(No Model.)

WITNESSES:
Francis H. Anglin
J. P. Appleman

INVENTOR
Thomas Murphy
BY
N. C. Evert & Co.
ATTORNEYS.

THE NORRIS PETERS CO., PHOTO-LITHO., WASHINGTON, D. C.

United States Patent Office.

THOMAS MURPHY, OF SEWICKLEY, PENNSYLVANIA.

BALL-BEARING SCISSORS.

SPECIFICATION forming part of Letters Patent No. 617,176, dated January 3, 1899.

Application filed January 7, 1898. Serial No. 665,884. (No model.)

*To all whom it may concern:*

Be it known that I, THOMAS MURPHY, a citizen of the United States of America, residing at Sewickley, in the county of Allegheny and State of Pennsylvania, have invented certain new and useful Improvements in Ball-Bearing Scissors, of which the following is a specification, reference being had therein to the accompanying drawings.

This invention relates to certain new and useful improvements in ball-bearing scissors, and has for its object to arrange a bearing whereby the two blades of the scissors may be retained firmly in their respective positions to each other and the loosening of the joint, so common with the ordinary scissors, be obviated.

The principal features of my invention reside in a washer which is retained by the head of the screw which fastens the two blades together, the said washer being provided on its under face with a circumferential groove which, together with a similar groove formed in one of the blades of the shears, acts as a race for the balls. Through this arrangement the screw fastening the two blades together may be kept tightly adjusted and a greater bearing-surface is provided on the outer face of the blade to accomplish the aforesaid result, while the balls interposed between the washer and the outer face of the blade will serve to reduce the friction that would otherwise be caused through the tightening of the screw.

With the above and other objects in view the invention finally consists in the novel construction, combination, and arrangement of parts, to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
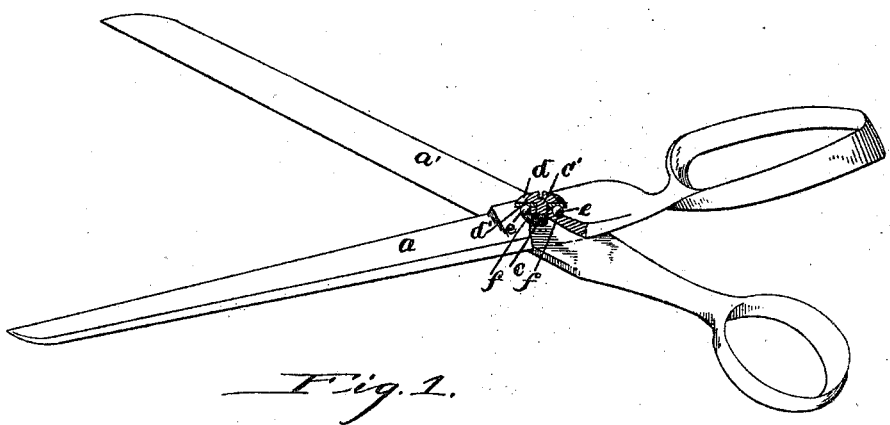
Figure 3:
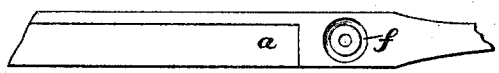
Figure 4:
Figure 2:
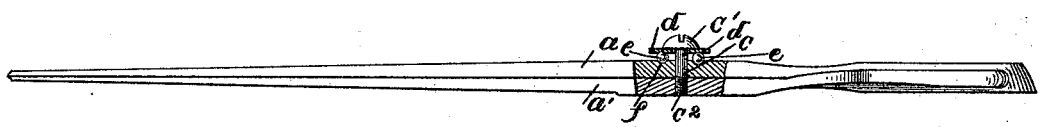

Figure 1 is a perspective view of a pair of shears, partly broken away, the same being constructed in accordance with my invention. Fig. 2 is a side view of a portion of the shears, partly in section, to show the arrangement of the bearing. Fig. 3 is a top plan view of a portion of the blade in which the circumferential groove that forms a part of the ball-race is arranged. Fig. 4 is an underneath plan view of the washer.

Referring now to the drawings by reference-letters, $a$ and $a'$ represent the respective blades of the scissors, which may of course be of any desired form or shape. These two blades are secured together by means of the pivotal screw $c$, having a suitable head $c'$ and upon which is arranged, between the said head $c'$ and the blade $a$, a washer $d$, which is provided on its under face with a circumferential groove $d'$, that forms half of the race for the balls $e$, the other portion of said race being formed of a circumferential groove $f$, that is arranged in the outer face of the blade $a$ around the hole in said blade which receives the pivotal screw. The portion of the pivotal screw that engages in the blade $a$ and which receives the washer is smooth on its periphery, while that portion that engages the blade $a'$ is provided with a thread $c^2$ to secure the screw in position. The operation of the device is clear without further description.

The above-described arrangement constitutes a ball-bearing between the washer $d$ and the blade $a$, the said balls being interposed in this position, forming a circumferential bearing, and thereby serving to hold the two blades in their perfect relation to each other. The balls also act in the reducing of the friction when the pivotal screw is tightened.

While the foregoing appears to embody the preferable form of my invention, yet I do not wish to limit myself to this exact construction as herein shown, as various changes may be made in the details of construction without departing from the general spirit of my invention.

Having fully described my invention, what I claim as new, and desire to secure by Letters Patent, is—

1. In combination, the shear-blade $a$, provided with a circumferential groove forming a ball-seat, the pivotal screw $c$, for fastening the blades $a$ and $a'$ together, the washer $d$ which is provided on its underneath face with a circumferential groove, and the balls arranged in said grooves in the washer, and shear-blade $a$, substantially as shown and described.

2. A ball-bearing scissors, comprising the two blades $a$ and $a'$, the pivotal screw by means of which the two blades are secured together, the washer carried by said screw, said washer and the shear-blade $a$ provided with circumferential grooves surrounding the pivotal screw, and forming a ball-race for the balls which are interposed in said grooves and rest between the washer and the shear-blade $a$, substantially as shown and described.

In testimony whereof I affix my signature in the presence of two witnesses.

THOMAS MURPHY.

Witnesses:
   JOHN NOLAND,
   WILLIAM E. MINOR.